March 27, 1945. H. L. DENTON 2,372,625
GEAR
Filed Nov. 11, 1942 2 Sheets-Sheet 1
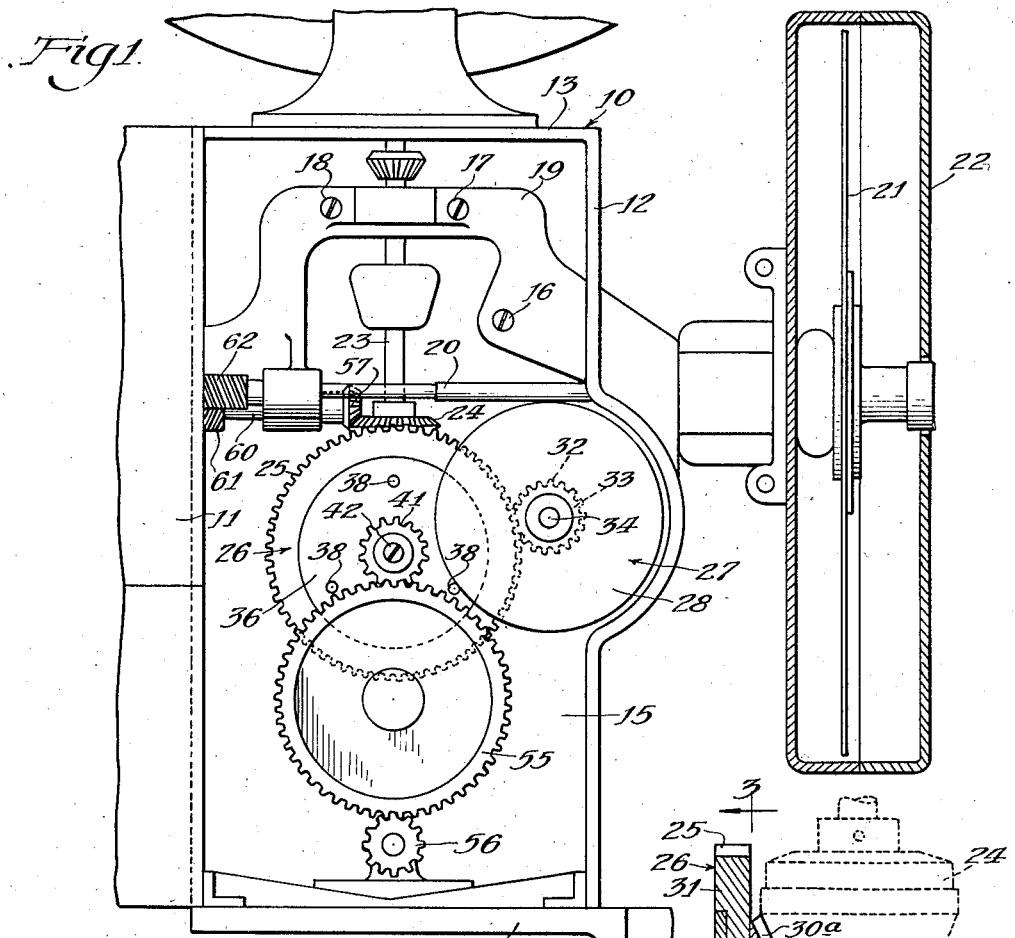
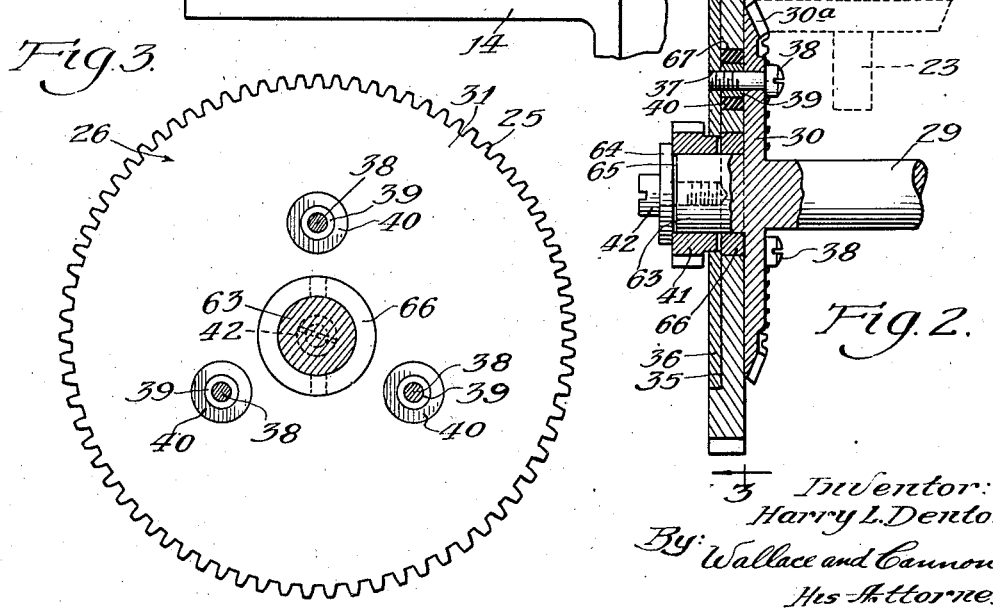
Inventor:
Harry L. Denton
By Wallace and Cannon
His Attorneys March 27, 1945.    H. L. DENTON    2,372,625
GEAR
Filed Nov. 11, 1942    2 Sheets-Sheet 2

Inventor:
Harry L. Denton
By:
Wallace and Cannon
His Attorneys

Patented Mar. 27, 1945

2,372,625

UNITED STATES PATENT OFFICE 2,372,625

GEAR

Harry L. Denton, Chicago, Ill., assignor to Wenzel Projector Company, Chicago, Ill., a corporation of Illinois Application November 11, 1942, Serial No. 465,276

3 Claims. (Cl. 74—411)

This invention relates primarily to motion picture projector apparatus and, secondarily, to a new and improved gear which may be used in conjunction with motion picture projectors as well as elsewhere and otherwise.

In the art of motion picture projectors of the commercial type, a substantial difficulty has been experienced for many years in the form of a vibratory or oscillatory movement imparted to certain parts of the operating mechanisms and, particularly to those parts of the operating mechanisms which are associated with the intermittent movement, and its fly wheel, and the shutter which also functions more or less as a fly wheel.

It has been found in the use of commercial motion picture projectors and particularly those of the so-called 35 mm. type, that the intermittent movement, fly wheel and the shutter tend to over run each other. This tends to cause sudden shock to certain parts of the operating mechanisms of the projector and consequent tendency to strip certain of the gears in the operating mechanism of the projector. Moreover, this difficulty also tends to set up an oscillatory movement in certain parts of the operating mechanisms of the projector which results in noisy operation thereof. This is believed to be due, in part, at least, to film pull or drag and the tendency of film pull or drag to retard the speed of the intermittent movement fly wheel and the resulting oscillatory movement of the intermittent movement fly wheel may readily be seen by examining operating mechanisms of a motion picture projector apparatus with a combination stroboscope-tachometer such, for example, as that which is known by the trade name "Strobotac" (General Radio Company).

Various attempts have been made heretofore to overcome the foregoing and related difficulties, experienced in the use of commercial motion picture projectors, but these attempts have not, insofar as I am aware, been successful.

An object of the present invention, therefore, is to afford a motion picture projector which embodies means for compensating for oscillatory movement imparted to the operating mechanisms of the projector, and particularly those which are associated with and are arranged between the intermittent movement and the shutter, and which probably are due to a tendency of the intermittent movement fly wheel and the shutter to over run each other in operation caused by film drag or otherwise.

A further object of the invention is to afford a new and improved motion picture projector embodying a novel and efficient intermediate gear assembly which, in use, compensates for the tendency of the intermittent movement fly wheel and the shutter to over run each other and cause noisy operation of the projector and tendency to strip certain of the gears in the operating mechanisms of the projector, and other incidental or related difficulties.

Another object of the invention is to afford, in one form or embodiment thereof, a novel shutter hub construction which, in use, compensates for the tendency of the intermittent movement fly wheel and shutter to over run each other and cause noisy operation of the projector and a tendency to strip the teeth on certain of the gears in the operating mechanism of the projector, and other incidental or related difficulties arising from the aforesaid tendency of the intermittent movement fly wheel and shutter to over run each other and set up oscillatory movement in those parts of the operating mechanisms of the projector which are associated therewith.

Another object of the invention is to afford a novel intermediate gear assembly for a motion picture projector and which embodies parts having a limited circumferential movement relative to each other but which are so constructed and arranged that they are not capable of either axial or radial movement with respect to each other, thereby compensating for a tendency of the intermittent movement fly wheel and shutter to over run each other while, at the same time, avoiding both axial and radial movement of certain of the component parts of the new intermediate gear assembly and the resultant noisy operation and tendency to stripping of gears which has been incidental to the use of other intermediate gear constructions intended to overcome the above mentioned and associated or incidental difficulties involved in the use of commercial motion picture projectors of the type to which the present invention primarily relates.

An additional object of the invention is to afford a novel and efficient intermediate gear assembly which, while being primarily intended for use as a so-called intermediate gear assembly in motion picture projectors of the commercial or so-called 35 mm. type, is also adapted for use in other machines and mechanisms where a cushioned gear assembly of this character may be found useful.

Other and further objects of the present invention will be apparent from the following description and claims and will be understood by reference to the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 1 is a view, partly in side elevation, and partly in section, showing parts of a commercial motion picture projector having the present invention embodied therein, one side wall of the projector housing being removed so as to show the arrangement of the parts therein and the shutter housing being shown in section so as to show the shutter arranged therein;

Fig. 2 is an enlarged central vertical sectional view showing a preferred form of the new intermediate gear assembly and the arrangement thereof in the projector which is illustrated in Fig. 1;

Fig. 3 is a view on line 3—3 in Fig. 2 partly in section and partly in side elevation, illustrating the new intermediate gear assembly;

Figure 4:
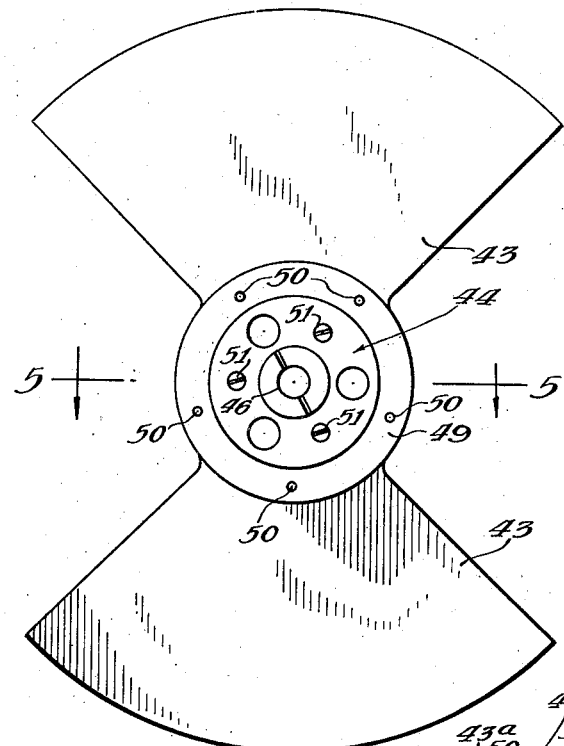
Fig. 4 is a side elevational view of a modified form of the present invention and illustrating the invention as embodied in a shutter hub construction.

A preferred and typical embodiment of the present invention is illustrated in Figs. 1 to 3, inclusive, wherein the present invention is shown as being embodied in a commercial motion picture projector of the rear shutter type, and those parts of such a projector are shown and will be described herein as are necessary to illustrate a typical and preferred environment in which the present invention is employed.

The rear shutter type projector which is partially illustrated in Fig. 1 comprises a housing 10 including a vertical front wall 11, a vertical rear wall 12, a top wall 13, a bottom wall 14 and a vertically extending central partition 15. Mounted in the housing 10, and secured to the central vertical partition 15, as at the points 16, 17 and 18, is a rear shutter shaft supporting bracket 19 which has a plurality of bearing portions in which a horizontally extending rear shutter-operating shaft 20 is journaled, the rear shutter-operating shaft 20 having a portion which extends rearwardly of the rear wall 12 of the projector housing and said extension carries the rear shutter 21 which is arranged in the rear shutter housing 22. As shown in Figs. 1 and 2, the rear shutter-operating shaft 20 is driven from a vertically extending drive shaft 23 which carries a double bevel gear 24. The upper end portion of the vertically extending drive shaft 23 is journaled in a bearing opening which is provided in the rear shutter shaft supporting bracket 19 and the lower end portion of the vertically extending shaft 23 is journaled in a bearing (not shown) but carried by the vertical partition 15. The upper row of teeth on the double bevel gear 24 meshes with a bevel gear 57 which is carried by a stub shaft 60 which extends parallel to but below the rear shutter-operating shaft 20. The stub shaft 60 carries a gear 61 which meshes with a gear 62 on the shutter-operating shaft 20.

The intermittent movement of the rear shutter type projector, which is illustrated in Fig. 1, is generally indicated at 27 and includes a fly wheel 28 carried by the center shaft 34 of the intermittent movement. Motion of the intermittent movement 27 and its fly wheel 28 are transmitted to the film advancing mechanism (not shown), in a manner which is well understood in the art and hence need not be described in detail herein.

As shown in Figs. 1 to 3, inclusive, the new and socalled intermediate gear assembly 26 is associated with a horizontally extending supporting shaft 29 and comprises a body portion or part 30 which is preferably metallic and which is shown as being formed as an integral flange upon the shaft 29. This part 30 of the new intermediate gear assembly 26, as shown in Fig. 3, has beveled gear teeth 30a formed thereon, on its peripheral edge, and these teeth 30a mesh with one of the two rows of beveled teeth upon the double beveled gear 24.

The new intermediate gear assembly 26 also includes a centrally arranged and main gear element 31 which is preferably formed of resinous or plastic material and this main gear element 31 of the intermediate gear assembly 26 is provided on its peripheral edge with a row of spur or spiral teeth 25 which mesh with a row of corresponding teeth 32 on a gear 33 which is carried by the center shaft 34 of the intermittent movement 27.

The body of the main gear element 31 of the new intermediate gear assembly 26 has an annular recess 35 formed in one side wall thereof, and disposed in this recess 35 is an annular and preferably metallic face plate 36. The plate 36 is provided with preferably at least three screw threaded openings 37 (Fig. 2) each of which is adapted to receive the threaded end portion of a bolt 38 which, and the bolts 38 and the screw threaded openings 37 therefor, are preferably arranged at intervals of 120° around and relative to the plate 36 of the intermediate gear assembly 26, as shown in Figs. 1 to 3, inclusive.

As shown in Fig. 2, the new intermediate gear assembly 26 includes a plurality of metallic ferrules or rings 39, each of which is arranged in an opening 67 formed in the body of the main gear element 31, around the bolt 38 therein, and between the two spaced cooperating parts 30 and 36 of the intermediate gear assembly 26. Surrounding each of the ferrules or rings 39, in each of the openings 67, is a compressible resilient cushioning element, in the form of a ring or ferrule 40, which is preferably made of resilient material such, for example, as natural or synthetic rubber or like material.

A small helical gear 41 is carried by an enlarged portion 63 of the shaft 29 at one side of the plate 36 which is embodied in the new intermediate gear assembly 26 and this gear 41 is keyed to the enlarged portion 63 of the shaft 29, as at 54 (Fig. 2). A screw or bolt 42 projects through an opening formed in the small helical gear 41 and into a screw threaded opening which is tapped in the enlarged portion 64 of the shaft 29, as shown in Fig. 2.

As shown in Fig. 2, a metallic bearing and spacing ring 66 is arranged around the enlarged portion 63 of the shaft 29 within a corresponding opening in the part 31 of the intermediate gear assembly 26. As is also shown in Fig. 2, a retaining washer 64 is carried by the clamping bolt 42, between the clamping bolt 42 and the enlarged portion 63 of the shaft 29, and a suitable small clearance of perhaps 0.010" or 0.015" is preferably provided between the enlarged outer end portion 63 of the shaft 29 and the washer 64, for a reason which will be explained presently.

The ring 66, as shown in Fig. 2, not only spaces the cooperating parts 30 and 36 of the intermediate gear assembly 26 but also provides a bearing for the central and main gear element 31 thereof, and when the bolt 42 is tightened to secure the parts of the intermediate gear assembly 26 in position of use, as in Fig. 2, the spacing ring 66 prevents pressure exerted upon the plate 36 from binding the two spaced cooperating parts 31 and 30 of the intermediate gear assembly 26 together which would prevent a desired limited relative movement between these parts, as will be explained more fully hereinafter.

As shown in Fig. 2, the limited clearance 65 allowed between the outer end of the enlarged portion 63 of the shaft 29 and the outer surface of the small helical gear 41 enables the retaining washer 64 to be forced by tightening of the bolt 42 slightly inwardly (left to right, Fig. 2) so as to force the retaining washer into binding engagement with the small helical gear 41 and thus assure that these parts of the intermediate gear assembly 26 will be securely held together.

As shown in Fig. 1, the small helical gear 41 meshes with a gear 55 which, in turn, meshes with a gear 56, and these gears 55 and 56 are a part of a gear train which is embodied in the operating mechanism of the projector.

In the use of the form of the invention which is shown in Figs. 1 to 3, inclusive, of the drawings, the rear shutter operating shaft 20, and the rear shutter 21 which is carried thereby, and the intermittent movement 27 and its fly wheel 28, are all operated or driven in a manner which is well understood in the art and hence need not be described in detail herein.

In the operation of a commercial motion picture projector embodying the present invention, and such as is illustrated in Figs. 1 to 3, inclusive, of the drawings, any tendency of the shutter 21 and intermittent movement fly wheel 28 to over run each other and set up an oscillatory or vibratory motion in the mechanisms associated therewith, and consequent noisy operation of the projector, as well as a tendency to cause stripping of the teeth of the gears embodied in the intermediate gear assembly and other gears associated therewith, is eliminated or compensated for by the novel construction and arrangement of the new intermediate gear assembly. This is due to the novel construction of the intermediate gear assembly 26 including the cushioning devices 39—40 which are so constructed and arranged that any tendency of the intermittent movement fly wheel 28, acting through the gear 32—33, and the teeth 25 of the intermediate gear assembly 26 to over run the shutter 21, will be absorbed or cushioned by and compensated for by the intermediate gear assembly 26 and the cushioning devices 39—40 which are embodied therein and, similarly, any tendency of the shutter 21 to over run the intermittent movement fly wheel 27 will likewise be absorbed or cushioned by and compensated for by the new intermediate gear assembly 26 and the cushioning devices 39—40 which are embodied therein.

It will be noted, in this connection, and by reference to Figs. 1 to 3, inclusive, of the drawings, that the flange 30 of the intermediate gear assembly shaft 29 is bolted to the plate 36 thereof so that the flange 30 and the plate 36 necessarily move together, as a unit, and cooperate together to form a part of the intermediate gear assembly 26, and which unit 30—36 is capable of a limited circumferential movement only relative to the other principal part of the intermediate gear assembly 26, namely, the main or central gear element 31 thereof.

As pointed out hereinbefore, the new intermediate gear assembly 26 is so constructed and arranged that the parts 30—36 and 31 thereof are confined to a circumferential movement relative to each other, so that any oscillatory motion, which may be set up in the projector mechanism, is absorbed or compensated for by the new intermediate gear assembly 26 and its cushioning devices 39—40 and hence does not cause, nor tend to cause, either radial or axial movement of the intermediate gear assembly 26 upon or relative to the intermediate gear assembly shaft 29, as has occurred in prior art intermediate gear assemblies which have been employed heretofore in an endeavor to compensate for oscillatory movement set up in the operating mechanism of the projector by the over running of the shutter 21 and the intermittent movement fly wheel 28 caused by film drag or otherwise.

Thus, for example, assuming that the shutter 21 should over run the intermittent movement fly wheel 28, by reason of film drag or for any other reason, one effect of this in the prior art projectors would be to act through the shutter operating shaft 20, gears 62 and 61, stub shaft 60, bevel gear 57, the double bevel gear 24, and the vertically extending drive shaft 23, to cause noisy operation and possible stripping of the intermeshing gear teeth on the double bevel gear 24 and the intermediate gear assembly 26. However, in the practice of the present invention, such over running of the shutter 21 is compensated for by reason of the fact that such over running of the shutter 21 merely acts, through the shutter-operating shaft 20, gears 62 and 61, stub shaft 60, bevel gear 57, double bevel gear 24 and the lower row of teeth thereon, the row of bevel gear teeth 30a on the flange or portion 30 of the intermediate gear assembly 26, the plate 36 and bolts 38 and small metallic ferrules or rings 39, to impart a limited circumferential movement to the parts 30—36—38—39 of the intermediate gear assembly 26, relative to the main gear element 31 thereof. This limited circumferential movement is made possible by reason of the cushioning effect of the small resilient or rubber rings or ferrules 40 and not only compensates for such possible over running of the shutter 21 but effectively prevents any stripping of the intermeshing teeth on the double bevel gear 24 and the teeth 30a on the intermediate gear assembly 26 but also has the additional advantage of preventing noisy operation of the projector which would otherwise result and as occurs in the use of prior art projectors of an otherwise similar character.

Similarly, for example, if the intermittent fly wheel 28 should over run the shutter 21, this is compensated for by reason of the fact that such motion will merely act, through the gear 32—33 and the teeth 25 of the intermediate gear assembly 26 to impart a limited circumferential movement to the main gear element 31 of the intermediate gear assembly 26, relative to the spaced and cooperating parts 30 and 36 thereof. Such limited circumferential movement of the main gear element 31 of the intermediate gear assembly 26, relative to the parts 30 and 36 thereof, merely compresses the small resilient or rubber ferrules or rings 40 around and relative to the hard and incompressible small metal ferrules or rings 39, thereby compensating for any over running of the intermittent movement fly wheel 28 relative to the shutter 21 and not only preventing possible stripping of the gears but also preventing noisy operation of the projector which would otherwise result from such over running of the intermittent fly wheel 28 relative to the shutter 21.

Figure 5:
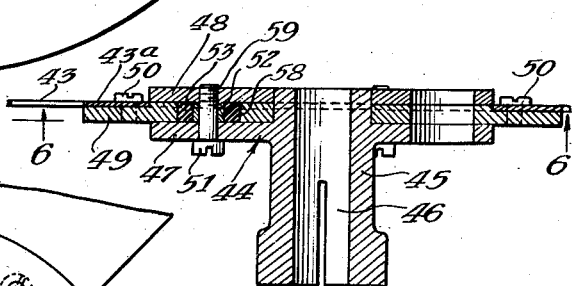
Fig. 5 is a transverse sectional view on line 5—5 in Fig. 4.
Figure 6:
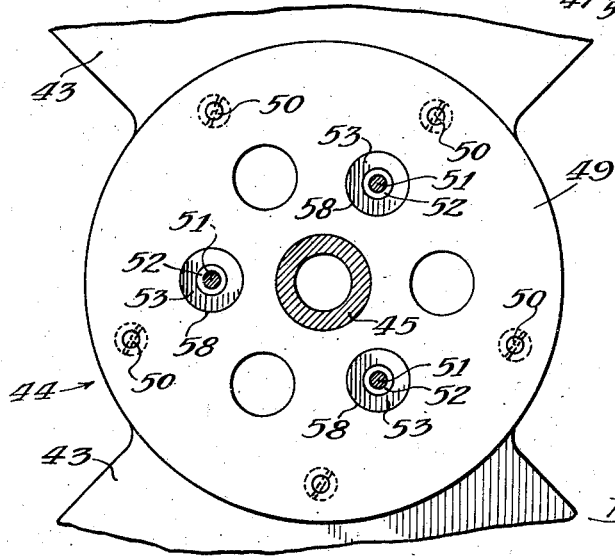
Fig. 6 is a view on line 6—6 in Fig. 5 partly in section and partly in elevation and illustrating the construction of the form of the invention which is illustrated in Figs. 4 and 5.

While the form of the invention which is illustrated in Figs. 1 to 3, inclusive, is a preferred construction and arrangement of the invention, as embodied in an intermediate gear for a motion picture projector, a modification of the invention is illustrated in Figs. 4, 5 and 6 of the drawings and in this form of the invention the same is associated with the shutter 43 and its hub structure which is generally indicated at 44.

As shown in Figs. 4, 5 and 6, the hub structure 44 of the shutter 43 includes a body 45 having a split sleeve or collar portion 46 which is adapted to be mounted upon the shutter-operating shaft of a motion picture projector.

As may be seen by reference to Fig. 5, the body 45 of the hub structure 44 has an annular flange 47 formed thereon and integrally therewith and a centrally apertured annular plate or disc 48, of approximately the same diameter as the flange 47, is mounted upon the hub portion 45 in spaced relationship with the flange 47.

The shutter blades 43—43, which are preferably integrally joined by a central web portion 43a, are, as shown in Figs. 4, 5 and 6, attached, by screws or bolts 50, to a centrally apertured annular carrier plate or supporting disc 49 which is arranged upon the hub body 45 between the annular flange 47 and the disc 48, as best shown in Fig. 5.

As may also be seen by reference to Figs. 5 and 6, the disc 49, which carries the integrally connected shutter blades 43, is provided with a plurality of annular openings, as 58, which are preferably at least three in number, and which are arranged radially around the said disc 49 at intervals of preferably approximately 120°. Inserted into each of the openings 58 is a small compressible resilient or rubber ferrule or ring 53 and arranged within each of these small resilient or compressible rubber ferrules or rings 53 is an incompressible and preferably metallic ferrule or ring 52. Bolts 51 are extended through openings in the flange 47 and one of these bolts 51 extends through each of the small metal ferrules or rings 52 and is inserted into a threaded opening, as 59, provided in the disc 48, thus completing the assembly of the shutter hub structure shown in Figs. 4, 5 and 6.

The operation and use of that form of the invention which is illustrated in Figs. 4, 5 and 6 are substantially similar to the operation and use of that form of the invention which is illustrated in Figs. 1, 2 and 3.

Thus, for example, if the shutter 43 should tend to over run the intermittent movement fly wheel, such over running of the shutter 43 will be compensated for by reason of the fact that such over running of the shutter 43 merely tends to act, through the disc 49, to compress the small resilient or rubber rings or ferrules 43 relative to and upon the incompressible small metal ferrules or rings 52. Hence, such overrunning motion of the shutter 43 will not be transmitted through the shutter-operating shaft to the other parts of the operating mechanism of the projector, such as are shown in Fig. 1, and hence the tendency to stripping of gears and noisy operation of the projector, and other difficulties, which would otherwise be caused by such over running of the shutter 43, are substantially eliminated in the use of that form of that invention which is shown in Figs. 4, 5 and 6.

While the invention has thus been specifically illustrated and described as applied, in two different forms thereof, to a motion picture projector of the rear shutter type, it will be understood that the new gear construcion which is illustrated in Figs. 2 and 3, as well as the structure which is illustrated in Figs. 4, 5 and 6, may be employed in connection with and as a part of other machines and devices and hence the invention, in its broader aspects, is not limited to use in motion picture projectors although it is in such devices that it will undoubtedly find its greatest utility.

It will also be understood, in this connection, that while the invention has been illustrated as being embodied in a motion picture projector of the rear shutter type the invention is equally useful with motion picture projectors of the front shutter type, and in which, as will readily be appreciated by persons skilled in the art, the shutter 21 and its housing 22 are associated with an extension of the shutter-operating shaft 20 to or at the front of the projector housing (left-hand side as seen in Fig. 1) rather than at the rear or right-hand side, as illustrated in Fig. 1 of the drawings.

It will thus be seen from the foregoing description, considered in conjunction with the accompanying drawings, that the present invention accomplishes its intended objects, and has the desirable advantages and characteristics, including those which have hereinbefore been specifically pointed out, as well as others which are inherent in the invention.

While I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A gear assembly comprising a main gear element including a gear body having an annular row of teeth provided on its peripheral edge and having a cylindrical central opening formed therein affording a cylindrical bearing surface coaxial with said annular row of teeth, said body member also having opposite side faces disposed parallel to each other and affording flat bearing surfaces perpendicular to the axis of said cylindrical bearing surface, said gear assembly including means defining an external cylindrical bearing surface disposed within and in bearing engagement with said internal bearing surface of said main gear element, and said gear assembly also including a pair of spaced cooperating parts arranged one on each side of the said main gear element of said gear assembly and having flat surfaces opposed respectively to said flat bearing surfaces of said body member to maintain said main gear element against tilting with respect to said axis of said cylindrical bearing member, means interconnecting the said pair of spaced cooperating parts of said gear assembly together for limited movement as a unit relative to the said main gear element of the said gear assembly, and compressible cushioning means arranged between the said spaced cooperating parts of said gear assembly, and within the body of the said main gear element, and compressible under the action of said interconnecting means for cushioning limited rotative movement of the said pair of spaced cooperating parts of the said gear assembly relative to the said main gear element thereof, one of said two spaced cooperating parts including a peripheral edge portion having a number of beveled gear teeth formed thereon, the said body of the said main gear element having a substantially annular recess formed in one side thereof, and the other of the said two cooperating parts of the said gear assembly being a substantially annular plate or disc mounted in the said substantially annular recess formed in the said body of the said main gear element.

2. A gear assembly as defined in claim 1 in which one of the said two spaced cooperating parts thereof includes a peripheral edge portion having a row of beveled gear teeth formed thereon, and in which the said body of the said main gear element has a substantially annular recess formed in one side thereof and in which the other of the said two cooperating parts of the said gear is a substantially annular plate or disc mounted in the said substantially annular recess in the said body of the said main gear element, and in which the said one of said two spaced cooperating gear parts which has the said row of beveled gear teeth formed on its peripheral edge is arranged in contact with and at the side of the said body of the said main gear element which is opposite the said side thereof at which the said substantially annular plate or disc is disposed in the said recess formed in the said body of the said main gear element.

3. A gear assembly as defined in claim 1 in which one of the said two spaced cooperating parts thereof includes a peripheral edge portion having a row of beveled gear teeth formed thereon, and in which the said one of the said two spaced cooperating parts of said gear assembly is formed integrally with, and as a substantially annular flange upon, a shaft for supporting the said gear assembly.

HARRY L. DENTON.